United States Patent [19]
Bannon

[11] Patent Number: 5,805,872
[45] Date of Patent: Sep. 8, 1998

[54] APPARATUS FOR GENERATION OF CONTROL SIGNALS FROM THE READ CYCLE RATE AND READ SPEED OF A MEMORY

[75] Inventor: Peter Joseph Bannon, Concord, Mass.

[73] Assignee: Digital Equipment Corporation, Maynard, Mass.

[21] Appl. No.: 525,108

[22] Filed: Sep. 8, 1995

[51] Int. Cl.$^6$ ...................................................... G06F 1/04
[52] U.S. Cl. ........................... 395/555; 395/558; 395/559
[58] Field of Search .................................... 395/555, 556, 395/558, 559, 403, 445

[56] References Cited

U.S. PATENT DOCUMENTS

| | | | |
|---|---|---|---|
| 5,239,639 | 8/1993 | Fischer et al. | 395/425 |
| 5,335,337 | 8/1994 | Gaglairdo et al. | 395/500 |
| 5,469,547 | 11/1995 | Pawlowski | 395/285 |
| 5,557,781 | 9/1996 | Stones et al. | 395/557 |
| 5,615,358 | 3/1997 | Vogley | 395/556 |

*Primary Examiner*—Dennis M. Butler
*Attorney, Agent, or Firm*—Ronald C. Hudgens

[57] ABSTRACT

A computer system including a cache which has a wave pipeline read controller is described. The system in addition to the cache memory includes a processor coupled to the cache memory. The processor includes a register stack which stores values corresponding to a wave number and read speed which is loaded as part of a configuration of the processor. The processor determines a repetition rate for read data corresponding to a difference between the values of read speed and wave number. The processor includes a logic delay line comprised of a plurality of clock delay elements, each of said elements providing successively increasing discrete delays to a clock signal fed to the logic delay line. The delay line is used to provide inputs to a first and second multiplexer which are respectively controlled by a signal corresponding to a desired repetition rate for read cycles and a signal corresponding to the read speed of the cache memory. The delay pipeline permits address cycles to initiated earlier increasing data read bandwidth while reducing data valid windows.

19 Claims, 4 Drawing Sheets

APPARATUS FOR GENERATION OF CONTROL SIGNALS FROM THE READ CYCLE RATE AND READ SPEED OF A MEMORY

BACKGROUND OF THE INVENTION

This invention relates generally to computer systems and more particularly to techniques for increasing the read bandwidth of cache memory systems.

As is known in the art, computer systems typically include a microprocessor, a memory system and an I/O system interconnected by a system bus. The memory system of a typical computer system generally includes one or more levels of so-called cache memory as well as a main memory. The cache memory is typically comprised of relatively expensive but relatively high speed static random access memories (SRAM) devices which are disposed between the main memory and the microprocessor. The main memory is typically comprised of dynamic random access memories (DRAM) having a lower cost per bit than SRAM but lower speed.

The cache memory is typically used to hold copies of one or more blocks of data which are stored in the main memory as well as persistent storage such as disk. The cache memory is used to increase the bandwidth of data which can be delivered to the microprocessor to increase system performance. Generally, cache memory systems can include a so-called "on chip" cache or primary cache which is tightly coupled to the inner logic of the microprocessor chip. This primary cache is relatively small, but is comprised of very high speed memory cells. The cache system generally also includes an a backup cache typically located "chip", that is, between the main memory and the microprocessor which generally has a speed lower than that of the primary cache, but higher than that of the main memory. Generally, the backup cache has significantly more storage capacity than the primary cache but less than that of main memory.

Several different cache protocols are used to control the operation of the cache and to insure that the cache has correct data and that the data in the cache is coherent with other caches which may be present in a multiprocessor system or that the cache is coherent with the data in the main memory or on disk.

One problem common to all cache systems, particularly those "chip" is to increase the performance of the cache memory since performance of the cache memory is a significant factor to determine overall computer system performance. One technique used to increase the read bandwidth for an off chip cache is to provide the address lines from the microprocessor to the cache memory and provide associated control circuits for the cache memory. Data from the cache memory is generally loaded or latched into the microprocessor on the clock edge of the system clock used to control the microprocessor. In order to increase the system bandwidth during read cycles for this arrangement, one known technique is to use an external delay element to delay the system clock signal by a predetermined amount and to feed the delayed system clock signal back to the microprocessor and use the delayed clock signal as the load signal to load the data from the data bus into the registers at the appropriate time. While this technique has some success in increasing the clock bandwidth, it has several disadvantages. One of the principle disadvantages is the appropriate selection of a delay element and the concomitant drift in the delay properties of the delay element over time. A second problem is that the delay element is typically implemented as a discrete device disposed external to the microprocessor thus requiring additional manufacturing steps to incorporate the delay element into a processor module which implements the above arrangement. Further still, the known approach is not programmable and is generally confined to a set of static random access memories having particular speed characteristics. If a faster or slower version of the static random access memories is desired for whatever reason, such as performance versus cost considerations, a new delay element needs to be used to provide the delay clock to the microprocessor element.

SUMMARY OF THE INVENTION

In accordance with the present invention an apparatus for controlling read cycles of a memory includes means, responsive to a signal initiating a read cycle, for delaying said signal over a plurality of discrete time periods and means, responsive to said signal delayed over said plurality of discrete periods, for providing a load data signal in accordance with a desired read speed, and for providing an initiation of a subsequent read cycle in accordance with a desired repetition rate of read cycles. With such an arrangement, higher data rates from a static random access memory system such as a off chip cache are provided without increasing the latency to obtain the first data element. Further, this digital implementation of wave pipelining does not require the addition of any circuits external to the microprocessor unless this arrangement is desired to be implemented externally. Furthermore, the implementation is programmable and flexible in that the value of wave as well as the value of read speed can be changed and adjusted in accordance with the types of memory used. In addition, the attendant clocks jitter and drift problems introduced by the use of an externally provided delay line are also avoided with this technique.

In accordance with a further aspect of the present invention, a computer system includes a cache memory and a processor coupled to the cache memory. The processor includes means for storing values corresponding to a wave number and read speed and means for providing a repetition rate corresponding to a difference between said read speed and wave number. The processor also includes a logic delay line comprised of a plurality of clock delay elements, each of said elements providing successively increasing discrete delays to a clock signal fed to the logic delay line. Coupled to the delay line are a first multiplexer having inputs coupled to each one of the outputs of the plurality of clock delay elements and having control inputs fed by a signal corresponding to a desired repetition rate for read cycles and a second multiplexer having inputs coupled to the outputs of said plurality of clock delay elements and having a control input fed by a signal corresponding to the read speed of the cache speed of a memory. With such an arrangement, higher data rates from the cache memory are provided without increasing the latency to obtain the first data element. Further, this digital implementation of wave pipelining does not require the addition of any circuits external to the microprocessor unless this arrangement is desired to be implemented externally. Furthermore, the implementation is programmable and flexible in that the value of wave as well as the value of read speed can be changed and adjusted in accordance with the types of static random access memory used. Also this arrangement does not impact the CPU clock as used in the remainder of the processor. That is, using an externally delayed CPU clock to control the data latch as in prior arrangements and its associated timing constraints is avoided. Further, in some implementations where the data latch in the processor may be used for system or private read transactions, it forgoes the need to provide two different clock signals to the latch. In addition, the attendant clocks jitter and drift problems introduced by the use of an externally provided delay line are also avoided with this technique.

BRIEF DESCRIPTION OF THE DRAWINGS

The foregoing features and other aspects of the invention will now become apparent when viewed with the accompanying drawings taken in conjunction with the accompanying description in which.

DESCRIPTION OF THE PREFERRED EMBODIMENTS

Figure 1:
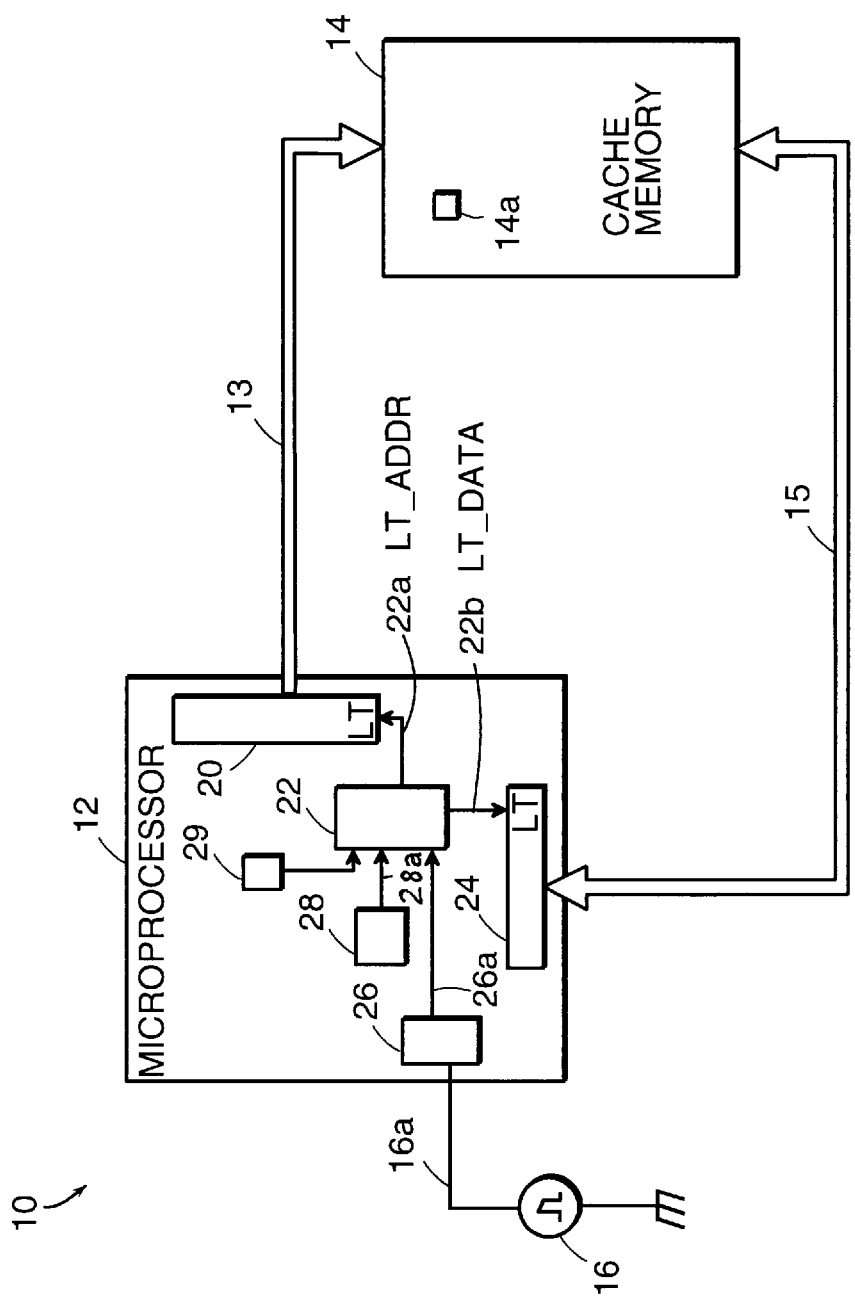
FIG. 1 is a block diagram of a portion of a computer system showing a microprocessor coupled to an off-chip cache.

Referring now to FIG. 1, a computer system 10 is shown to include a microprocessor 12 and an off-chip cache memory 14. Not shown, but which would also be included in the computer system 10 are a an interface between the off-chip cache and a system bus, as well as a main memory, and an I/O interface interconnected by the system bus. The I/O interface is generally coupled to peripheral devices including secondary storage such as disk storage. Additional I/O interfaces may be included to interconnect printers, terminals keyboards and displays, as is well known.

In addition, the computer system 10 may be a uniprocessor system having a single microprocessor 12 or a multiprocessor system having a plurality of such microprocessors 12 and associated or shared cache memories 14.

The microprocessor 12 is coupled to the cache memory 14 by an address bus 13 and a bi-directional data bus 15. The cache memory 14 is comprised of a plurality of memory elements 14(a), here implemented by static random access memory circuits, and also includes a cache controller (not shown) generally resident in the microprocessor 12. Here the microprocessor 12 includes at least one on-chip cache memory comprised of SRAM's (not shown) making the cache memory 14 a secondary cache system. In addition, in some implementation of the microprocessor 12, the microprocessor can include a primary cache memory and a secondary cache memory located on-chip making the cache memory 14 a backup or third level cache memory. The microprocessor 12 includes a latch circuit 20 which is used to latch a cache memory address and provide such address to the cache address bus 13. The latch 20 is fed an address from the cache controller located in the microprocessor 12 and not shown here. The latch 20 is controlled by a signal LD_ADDR on line 22a. Signal LD_ADDR is provided from a read-wave pipeline control logic circuit 22 which also provides a signal on line 22b LD_DATA. Signal LD_DATA is fed to a second latch 24. Latch 24 is used to latch data coming to and being driven from the microprocessor 12 along by directional data bus 15. The read-wave pipeline control logic 22 is also fed signals from a register file 29 which includes configuration data and which is loaded at the initialization or the start of the microprocessor 12 during a booting operation, as will be further described in conjunction with FIG. 2. The read-wave pipeline control logic 22 is also fed by a signal provided via line 28a from conventional arbitration logic 28 which is used to initiate a read cycle of cache memory 14. The readwave pipeline control logic 22 is also fed the CPU clock, via line 26a which is used to clock all the synchronous circuits in the microprocessor 12. The CPU clock on line 26a is derived from a clock circuit 26 which is fed from an external oscillator 16(a). Typically, the clock circuit 26 is used to provide a low skew timing signal for all clocked elements in the microprocessor and the system.

Figure 2:
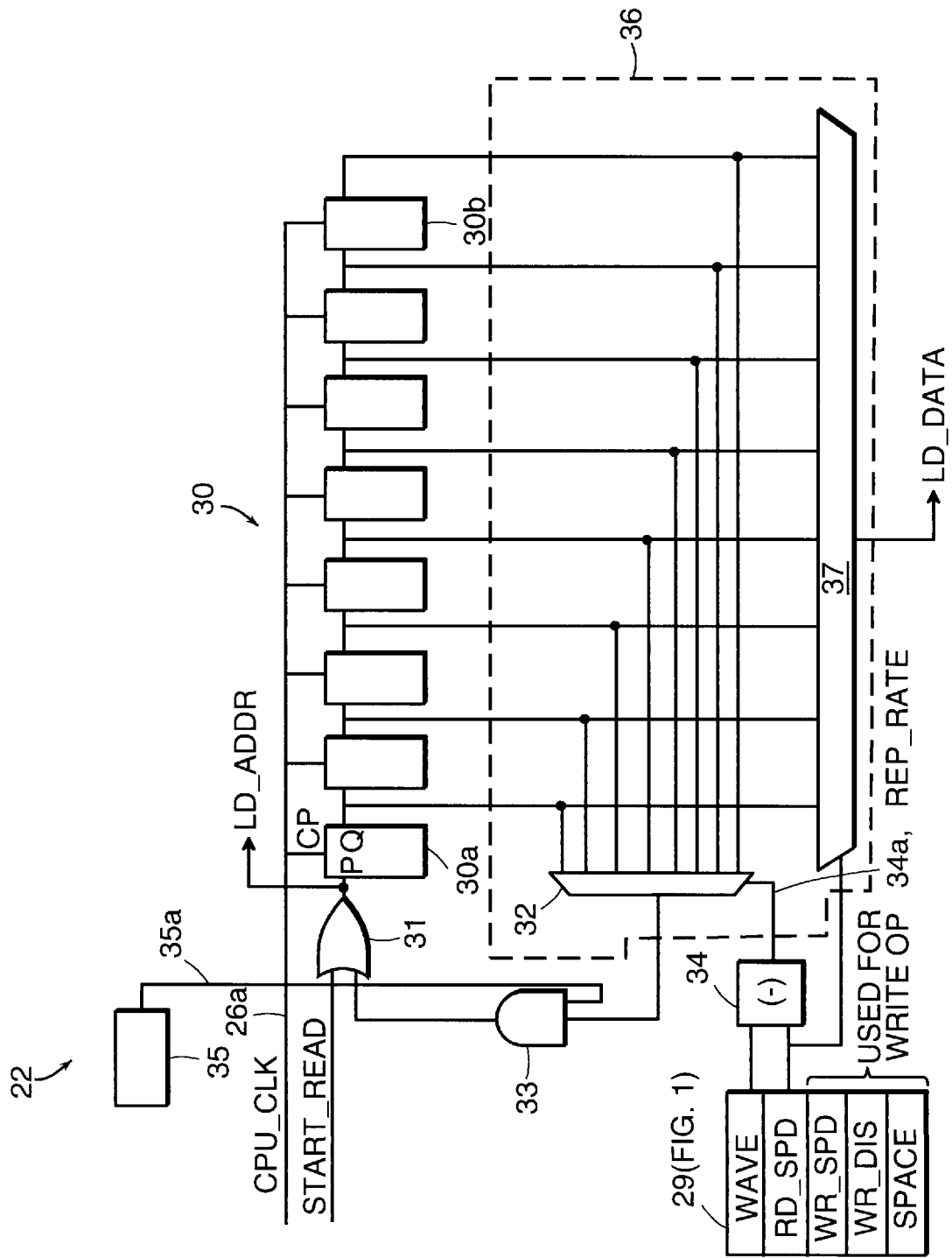
FIG. 2 is a simplified logic diagram showing a control circuit used to implement a wave pipeline arrangement to control read accesses of the cache memory of FIG. 1.

Referring now to FIG. 2, the read-wave pipeline control logic 22 is shown to include a read pipeline 30 comprised of a plurality of delay elements 30a to 30h such as flip-flops or latches and which are controlled via the CPU clock signal CPU_CLK which controls other circuits in the microprocessor. Thus a signal fed to a first one of said delay element, here element 30a, will be clocked through to subsequent ones of the delay elements and the signal will be delayed by a predetermined amount in accordance with the period of the CPU clock. Thus, as the signal through succeeding one of the elements 30b to 30h, the signal is provided with successively increasing discrete phase delays as it propagates towards the last one of the delay elements, here element 30h.

The outputs from each of the said delay elements 30a to 3h are coupled to a first multiplexer 32. The multiplexer 32 is used to select the outputs of one of the plurality of delay elements 30(a)–30(h). The selected signal or selected phase delayed version of the input signal to the delay line provides a signal which is used to initiate the second and all subsequent read cycles for the read-wave pipeline control logic 22. The multiplexer 32 is controlled by a control signal 34 which selects one of said here eight inputs (corresponding to the number of stages in the delay pipeline) to provide at the output thereof, in accordance with a repetition rate desired for the read-wave pipeline control logic 22. The repetition rate which is provided on line 34(a) is a multi-line signal REP_RATE (here three lines corresponding to 8 different states) is provided from the output of a subtractor circuit 34 having an encoder (not shown). Subtractor 34 is fed via two of the configuration values which are fed into cache memory configuration registers 29 (FIG. 1). Here the two values are the WAVE number and the read speed (RD_SPD). This subtractor function can be implement in hardware or software. The read speed is determined during booting of the computer system by a conventional routine which determines the types of SRAMS which are located in the cache memory 14, and in accordance with the speed of the cache RAMS assigns a number corresponding to the number of UPU cycles over which a read operation can occur. The wave number is likewise determined at configuration time in accordance with the determined speed of the SRAMS in the cache memory 14 and the desired repetition rate required for read operations. The difference, therefore, between the read-speed value and the wave value is used to determine the repetition rate. With the constraint on the repetition rate being related to the amount of time which data needs to remain valid as will be further described in conjunction with FIG. 4.

The configuration registers 29 further include values for write operations which are not germane to the present invention but which would also be configured during booting to write to the cache memory 14.

The output of the multiplexer 32 thus provides a selected one of the delayed versions of the signal fed through the read-pipeline 30 to here an AND gate 33 which will pass that signal to an OR gate 31 and feed the signal back to the input of the first one of the delay elements 30a. The OR gate 31 is also fed by a signal called "start read" which is used to initiate the first read cycle in the read-wave pipeline control logic 22 with all subsequent cycles being initiated by the line coming from the output of AND gate 33. The output of OR gate 31 is thus the signal LD_ADDR which is used to load the address in latch 22a. This signal propagates down each of the delay elements 30a to 30h and the outputs of those elements are coupled to the multiplexer 32. One of those elements is selected in accordance with the value of signal (REP_RATE) on lines 34a to provide that signal having a selected amount of delay back to the OR gate 31 to initiate the next cycle. This logic is thus used to control the initiation of subsequent read cycles in the read-wave pipeline control logic 22.

The outputs from the delay elements 30a to 30h are also fed to a second multiplexer 37 whose output provides the signal LD_dDATA or load data. The multiplexer selects one of the inputs to provide the output signal LD_DATA in accordance with the value of read speed signal RD_SPD which is coupled from the appropriate configuration register in register stack 29. Generally, RD_SPD as REP_RATE are encoded values here three lines to select one of the eight potential inputs to multiplexers 32 and 37. Multiplexers 32 and 37 provide the memory control signal generation logic 36 used to generate the load-address signal LD_ADDR and a load-data signal LD_DATA.

The read-wave pipeline 22 further includes a counter 35 which is pre-loaded with a value corresponding to size of the block of data to be transferred during a read operation and which is decremented after each read operation. When the counter is at a predetermined state such as zero it provides a signal along line 35a which indicates that the predetermined block size has been transferred and thus halts and clears the read-wave pipeline 30 such that no subsequent read cycles are initiated until a new START_READ is asserted.

Figure 3:
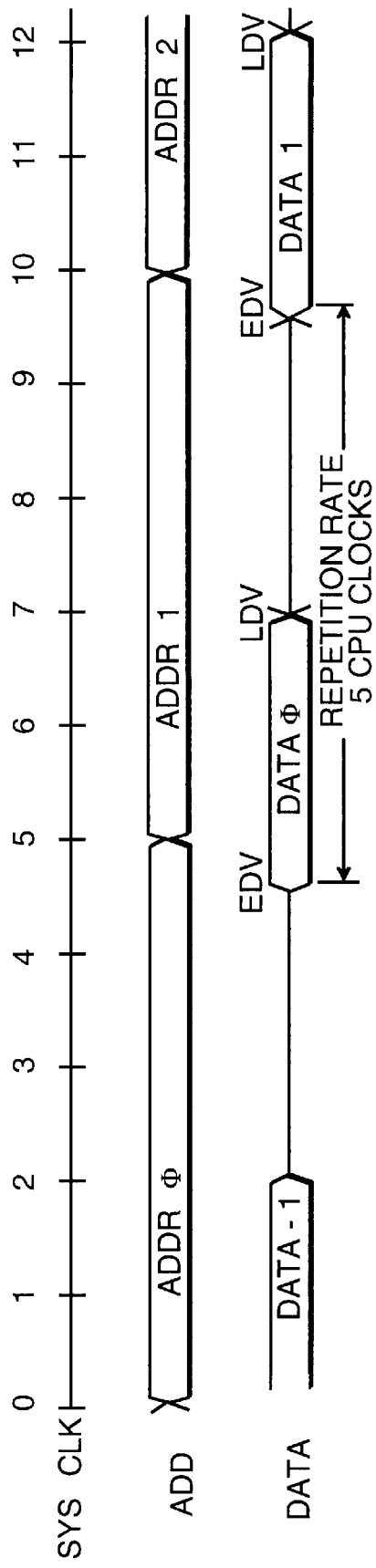
FIG. 3 is a timing diagram showing the relationship between assertion of address signals and valid data for the cache memory when wave pipeline is not being used.

Referring now to FIG. 3, a typical read cycle for the cache memory 14 comprised of static RAMs is shown for the case where WAVE=0 in terms of system clock cycles, here cycles 0 to 11. At clock cycle 0 at the initiation of an address ADDR0 data corresponding to that address becomes valid at some time period EDV (earliest data valid) which here is approximately four and one-half cycles after the assertion of ADDR0. Data 0 will remain valued for a time period LDV (latest data valid), at the end of which data will no longer be valid on the data bus 15. Thus, somewhere between EDV and LDV data is latched and coupled into the microprocessor. For a subsequent address read cycle ADDR1 is asserted on the address lines at the start of here clock cycle 5 and data for ADDR1 becomes valid at EDV occurring at approximately nine and one-half clock periods and goes invalid at LDV occurring at approximately twelve clock periods. Thus, without the wave pipeline turned on (i.e. wave number is zero) valid read data occurs every five clock cycles as would be expected with a conventional approach.

Figure 4:
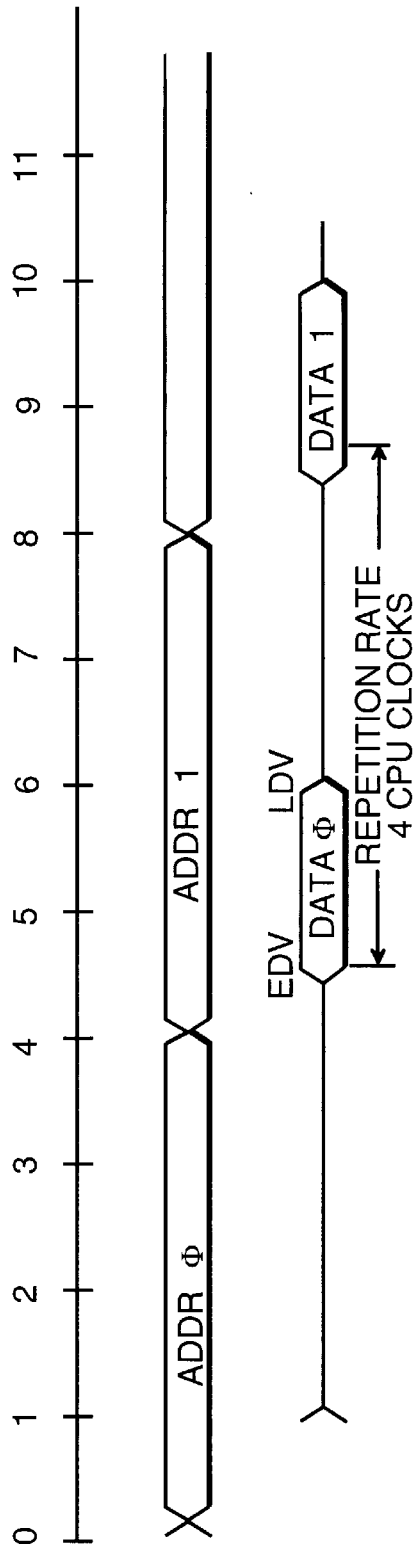
FIG. 4 is a timing diagram showing the relationship between assertion of address signals and valid data when the wave pipeline arrangement shown in FIG. 2 is being used.

Referring now to FIG. 4, the read rate for the cache memory 14 using the read-wave pipeline control logic 22 (FIG. 2) provides a faster or a higher repetition rate of read data from the cache memory. FIG. 4 illustrates the case where a single cycle of wave pipelining is introduced into the read-wave pipeline control logic 22 via a value of 1 placed in the configuration register 29 for the value of WAVE. By providing the value of 1 in WAVE, with the read speed being equal to five UPU clock periods as described above with WAVE=0, the repetition rate between valid data during the read cycles is four clock periods.

Thus, every fourth clock period, a new address is asserted on the address bus 13, as shown in FIG. 4, by address ADDR0 and ADDR1 being four clock periods wide and occurring on the 0 and fourth clock system clock edges respectively. For ADDR0, the earliest data valid point EDV still occurs approximately four and one-half clock periods after assertion of an address ADDR 0. The data is valid until the late data valid point LDV which now occurs one clock period earlier than late data valid LDV occurred for the control logic without the wave pipelining. Thus, when WAVE is equal to 1, the data valid window is shrunk by one clock period but the repetition rate is reduced by one clock period, thus increasing overall read data bandwidth. Accordingly, the start of data valid (early data valid) (EDV) is the time from the latest possible clock edge plus the maximum delay through each component in the access input path and the setup time to latch. The end of the data valid window (LDV) is at the next earliest possible input edge plus the minimum delay through each component in the access path minus the hold time of the latch. If the latch 24 in microprocessor 12 is loaded after EDV and before LDV, then the data is valid and correct. In principle, any number of cycles of wave pipelining can be implemented in the wave pipeline control logic 22 by providing an appropriate number of stages and appropriate synchronous high frequency clock signal. In the arrangement as shown and described, the CPU clock signal on line 26a has the same period as the CPU clock signal used throughout the remainder of the microprocessor, and thus each element has one clock period delay and generally for most cases the value of wave is between zero (i.e. no wave pipelining and hence normal operation as shown in FIG. 3) to 3 or three cycles of wave pipelining. The exact value of WAVE which is selected would be determined in accordance with the access time requirements of the memories, the clock period, as well as the propagation delays through the access paths as mentioned above as well as the desired repetition rate.

Figure 5:
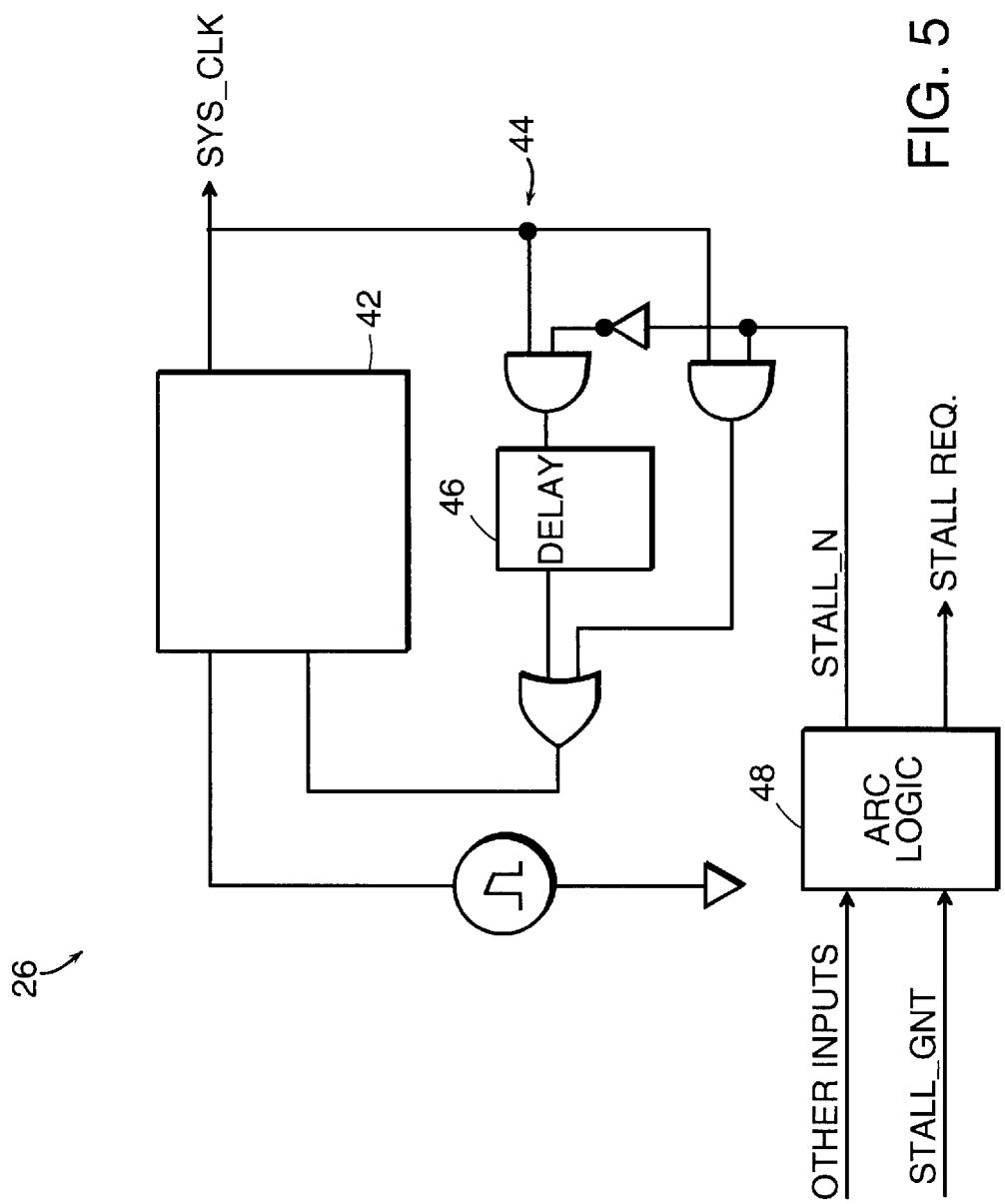
FIG. 5 is a logic diagram showing a clock handshaking arrangement.

In the processor shown in FIG. 1, the processor includes the clock circuit 26. As shown more clearly in FIG. 5 the clock circuit 26 includes a digital phase locked loop 42 which provides additional hold time requirements for wave pipelining in the read wave pipeline control logic 22. That is, in the digital phase locked loop uses a reference clock 16 which generates and is compared to the system clock to synchronize and lock the system clock. It is desirable for the rising edge of the reference clock to line up precisely with the rising edge of the processor clock else phase lock may be lost. The digital phase locked loop 42 is used to keep the two edges close by introducing a small known drift between the two and stalling one of the clocks to keep the two clock edges close. This drift causes the system clock edge to move towards the reference clock edge. As the system clock edge moves towards the reference clock edge such that the edges will become coincident, the digital phase lock loop 42 stalls the system clock for one clock phase via logic 44 to cause the UPU system clock to move back in front of the reference clock.

In the read wave pipeline control logic 22, if the processor clock is stalled during the wave part of a cache access, it would increase the hold time requirement by one clock period which is undesirable. To avoid this extra hold-time requirement, a hand shaking arrangement is provided between the digital phase locked loop and the cache controller such that when the digital phase lock loop desires to stall the system clock, it sends a stall request (STALL_REQ) to the cache controller and the cache controller will respond with a grant (STALL_GNT) from an abritration logic circuit 48. The arbritration logic 48 will respond in such a manner that the stall signal (STALL_N) which enables the SYS_CLK to return to the phase lock loop will not be enabled through the delay element 46 during the wave portion of a cache access (i.e. when the counter 35 is not reset or it indicates that the is no cache read cycle pending or in process). Therefore, this removes a need to introduce extra phase timing to the hold requirements when calculating the value of the late data valid window.

The above arrangement provides higher data rates from a static random access memory system such as a off chip cache without increasing the latency to obtain the first data element. Further, the digital implementation of this wave pipelining approach does not require the addition of any circuits external to the microprocessor unless this arrangement is desired to be implemented externally. Furthermore, the implementation is programmable and flexible in that the value of wave as well as the value of read speed can be changed and adjusted by configuration logic in accordance with the types of static random access memory used in the backup cache. Thus, a single configuration routine needs to be established to implement different grades or qualities of the backup cache 14. Also, since this arrangement does not impact the CPU clock, that is delaying the CPU clock as in prior arrangements, it is not necessary to worry about the timing constraints which may occur due to the use of a delayed clock signal. Further, in some implementations where the data latch may be used for system or private read transactions, it forgoes the need to provide two different clock signals to the latch. In addition, the attendant clocks jitter and drift problems introduced by the use of a delay line are also avoided with this technique.

Having described preferred embodiments of the invention, it will now become apparent to one of ordinary skill in the art, that other embodiments incorporating its concept may be used. Thus, it is felt that the invention should not be limited to disclosed embodiments, but rather should be limited only by the spirit and scope of the appended claims.

What is claimed is:

1. An apparatus for controlling read cycles of a memory comprising:
   means, responsive to a signal initiating a read cycle, for delaying said signal over a plurality of discrete time periods; and
   means, responsive to said signal delayed over said plurality of discrete periods, for providing a load data signal in accordance with a desired read speed, and for providing an initiation of a subsequent read cycle in accordance with a desired repetition rate of read cycles, said means for providing load data and initiation of read cycle signals further comprising:
      a first multiplexer fed by the signal delayed over each of said plurality of discrete periods, said first multiplexer being controlled by a signal corresponding to the desired repetition rate of read cycles; and
      a second multiplexer fed by the signal delayed over said plurality of discrete time periods and controlled by a signal corresponding to the desired read speed of the memory.

2. The apparatus of claim 1 wherein said apparatus further comprises:
   means for providing said repetition rate comprising:
      means for subtracting a value corresponding to a wave number from a value corresponding to the read speed to provide said repetition rate signal to the second multiplexer.

3. The apparatus as recited in claim 2, wherein said means for subtracting corresponds to a software routine which subtracts the values of the wave number from the read signal.

4. The apparatus as recited in claim 2 wherein said means for subtracting comprises a subtractor fed by values corresponding to the wave number and the read speed.

5. The apparatus as recited in claim 1 further comprises:
   means for providing a read-done signal to halt and clear the apparatus.

6. The apparatus as recited in claim 6 wherein said means for providing the read-done signal comprises:
   a counter pre-loaded with a value corresponding to the size of a block of data to be read; and
   means for decrementing said counter to provide said signal when the value of the size of the block has been transferred.

7. The apparatus of claim 1 wherein said memory is a cache memory that is a backup cache to a cache located on a microprocessor chip included in the apparatus.

8. An apparatus for controlling read cycles of a memory comprising:
   a logic delay line comprised of a plurality of clock delay elements, each of said elements providing successively increasing discrete delays to a clock signal fed to the logic delay line;
   a first multiplexer having inputs coupled to each one of the outputs of the plurality of clock delay elements and having control inputs fed by a signal corresponding to a desired repetition rate for read cycles; and
   a second multiplexer having inputs coupled to the outputs of said plurality of clock delay elements and having a control input fed by a signal corresponding to a read speed determined from a speed of the memory.

9. The apparatus of claim 8 wherein said apparatus further comprises:
   means for providing said repetition rate comprising:
      means for subtracting a value corresponding to a wave number from a value corresponding to the read speed to provide said repetition rate signal to the second multiplexer.

10. The apparatus as recited in claim 9, wherein said means for subtracting corresponds to a software routine which subtracts the values of the wave number from the read signal.

11. The apparatus as recited in claim 9 wherein said means for subtracting comprises a subtractor fed by values corresponding to the wave number and the read speed.

12. The apparatus as recited in claim 8 further comprises:
   means for providing a read-done signal to halt and clear the apparatus.

13. The apparatus as recited in claim 12 wherein said means for providing the read-done signal comprises:
   a counter pre-loaded with a value corresponding to the size of a block of data to be read; and
   means for decrementing said counter to provide said signal when the value of the size of the block has been transferred.

14. A computer system apparatus, comprising:

a cache memory a processor coupled to said cache memory said processor comprising:

means for storing values corresponding to a wave number and read speed;

means for providing a repetition rate corresponding to a difference between said read speed and wave number;

a logic delay line comprised of a plurality of clock delay elements, each of said elements providing successively increasing discrete delays to a clock signal fed to the logic delay line;

a first multiplexer having inputs coupled to each one of the outputs of the plurality of clock delay elements and having control inputs fed by a signal corresponding to a desired repetition rate for read cycles; and a second multiplexer having inputs coupled to the outputs of said plurality of clock delay elements and having a control input fed by a signal corresponding to the read speed.

15. The apparatus as recited in claim 14, wherein said means for subtracting corresponds to a software routine which subtracts the values of the wave number from the read signal.

16. The apparatus as recited in claim 14, wherein said means for subtracting comprises a subtractor fed by values corresponding to the wave number and the read speed.

17. The apparatus as recited in claim 14 further comprises:

means for providing a read-done signal to halt and clear the apparatus.

18. The apparatus as recited in claim 17 wherein said means for providing the read-done signal comprises:

a counter pre-loaded with a value corresponding to the size of a block of data to be read; and means for decrementing said counter to provide said signal when the value of the size of the block has been transferred.

19. An cache controller for controlling read cycles of a memory comprising:

means, responsive to a signal initiating a read cycle, for delaying said signal over a plurality of discrete time periods; and means, responsive to said signal delayed over said plurality of discrete periods, for providing a load data signal in accordance with a desired read speed, and for providing an initiation of a subsequent read cycle in accordance with a desired repetition rate of read cycles;

clocking means for synchronizing a plurality of said signals initiating read cycles comprising:

a digital phase locked loop responsive to a reference clock which is compared to the system clock to synchronize and lock the system clock with the digital phase locked loop used to keep edges of the reference and system clocks close by introducing a small known drift between the reference and system clocks; and means for stalling one of the clocks to keep the two clock edges close;

means for sending a stall request to the cache controller; and the cache controller further comprising:

means for granting said stall request over a time interval such that the stall will not take place in the portion of the wave part of the cache access.

* * * * *